(No Model.)

L. T. HATFIELD.
HAY RAKE.

No. 276,689. Patented May 1, 1883.

Attest:
W. J. Kesl
Charles Pickles

Inventor:
Llewellyn T. Hatfield
by C. D. Moody
atty

UNITED STATES PATENT OFFICE.

LLEWELLYN T. HATFIELD, OF MILAN, MISSOURI.

HAY-RAKE.

SPECIFICATION forming part of Letters Patent No. 276,689, dated May 1, 1883.

Application filed September 20, 1882. (No model.)

*To all whom it may concern:*

Be it known that I, LLEWELLYN T. HATFIELD, of Milan, Sullivan county, Missouri, have made a new and useful Improvement in Hay-Rakes, of which the following is a full, clear, and exact description, reference being had to the annexed drawings, making part of this specification, in which—

Figure 1:
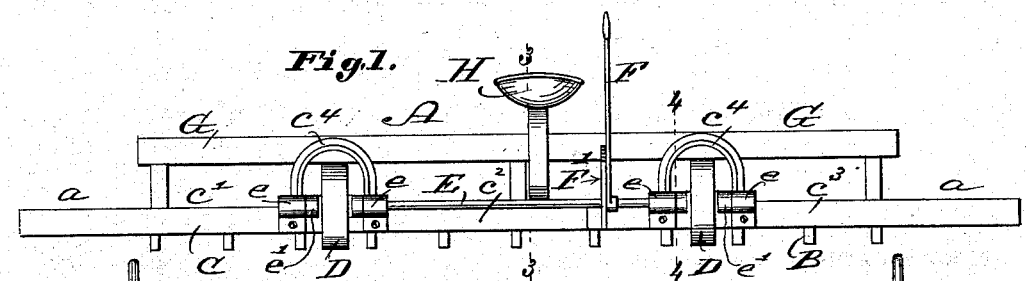
Figure 2:
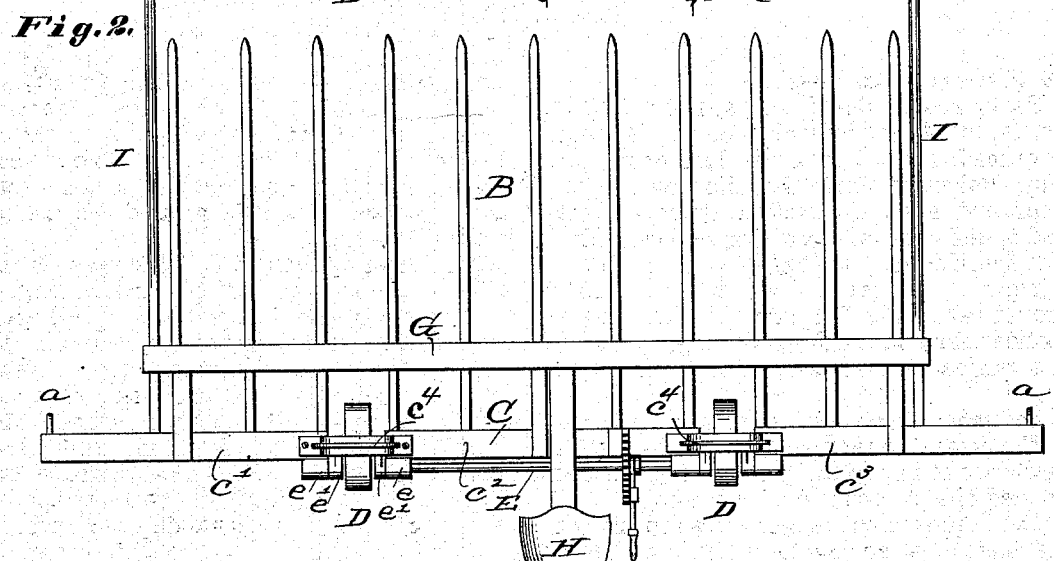
Figure 3:
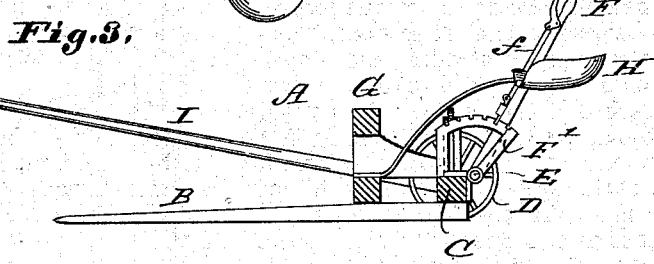
Figure 4:
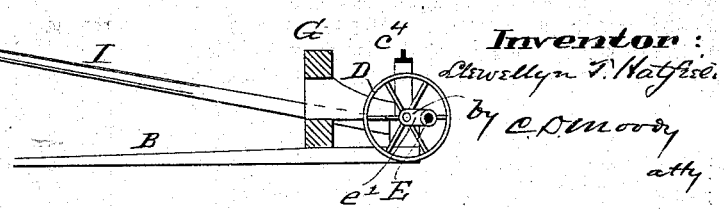

Figure 1 is a rear end elevation of the improved rake; Fig. 2, a plan; Fig. 3, a vertical section taken on the line 3 3 of Fig. 1, and Fig. 4 a vertical section taken on the line 4 4 of Fig. 1.

The same letters denote the same parts.

The present invention is an improvement in that class of hay-rakes in which the horses are hitched one at each end of the rake.

The improvement relates more especially to the mode of attaching the wheels and seat of the rake, the object being to provide for more effectually balancing and directing the operation of the rake and controlling the horses.

A represents the improved rake, having the teeth B attached to the head C. Two wheels, D D, are attached to the rake in the line of the head and so as to divide the rake lengthwise into three parts equal, or nearly so, to each other. To admit the wheels D D, the head C is divided into three sections, $c'$ $c^2$ $c^3$, connected by the arches $c^4$ $c^4$. The wheels D D are journaled upon the crank-axle E, the axle turning in the bearings $e$ $e$ and the cranks $e'$ $e'$ extending inwardly beneath the arches $c^4$ $c^4$. A lever, F, is attached to the axle E, and is provided with a dog, $f$, which engages in the rack F' upon the head C. The rake is strengthened by the bar or plate G, which is attached to the teeth in front of the head C, substantially as shown. The bar G also forms an abutment for the hay to rest against. The seat H is conveniently attached to the bar G. The weight of the driver balances the rake upon the axle. By operating the lever F the rake at the back can be raised or lowered, and thereby enable the rake-teeth to be adjusted to suit the ground and the position of the hay.

The horses are attached to the rake at the ends $a$ $a$, and at each end of the rake a tongue, I I, projects forward and upward. The horses are fastened to the tongues by suitable tie-straps, preventing them from turning away from the rake. Suitable holdback-straps can also be attached to the tongue, to enable the horses to back the rake from the swath, rick, stack, or any obstruction. Each horse is controlled by a single line with check-straps on each side of the mouth, enabling the driver in the seat H to guide and control both horses, in place of, as heretofore has been necessary in rakes of the kind under consideration, having a driver for each horse.

I claim—

1. The combination, in the rake A, of the sections $c'$ $c^2$ $c^3$, the arches $c^4$ $c^4$, the wheels D D, the crank-axle E, the lever F, and the rack F', substantially as described.

2. The combination, in the rake A, of the sections $c'$ $c^2$ $c^3$, the wheels D D, the crank-axle E, the lever F, the rack F', and the seat H, substantially as described.

3. The combination, in the rake A, of the teeth B, the sectional head C, and the bar or plate G, substantially as described.

LLEWELLYN T. HATFIELD.

Witnesses:
C. D. MOODY,
REES O. DAVIS.